(12) United States Patent
Gu

(10) Patent No.: US 9,990,079 B2
(45) Date of Patent: Jun. 5, 2018

(54) PHOTOSENSITIVE ARRAY SUBSTRATE, METHOD FOR DRIVING THE SAME, OPTICAL TOUCH SCREEN AND DISPLAY DEVICE

(71) Applicants: BOE TECHNOLOGY GROUP CO., LTD, Beijing (CN); HEFEI XINSHENG OPTOELECTRONICS TECHNOLOGY CO., LTD., Hefei (CN)

(72) Inventor: Xiaofang Gu, Beijing (CN)

(73) Assignees: BOE TECHNOLOGY GROUP CO. LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 71 days.

(21) Appl. No.: 15/032,303

(22) PCT Filed: Sep. 17, 2015

(86) PCT No.: PCT/CN2015/089874
§ 371 (c)(1),
(2) Date: Apr. 26, 2016

(87) PCT Pub. No.: WO2016/145808
PCT Pub. Date: Sep. 22, 2016

(65) Prior Publication Data
US 2017/0102812 A1 Apr. 13, 2017

(30) Foreign Application Priority Data
Mar. 19, 2015 (CN) .......................... 2015 1 0121838

(51) Int. Cl.
*G06F 3/041* (2006.01)
*G06F 3/042* (2006.01)

(52) U.S. Cl.
CPC .......... *G06F 3/0416* (2013.01); *G06F 3/0412* (2013.01); *G06F 3/0421* (2013.01)

(58) Field of Classification Search
CPC ..... G06F 3/0416; G06F 3/0412; G06F 3/0421
See application file for complete search history.

(56) References Cited

U.S. PATENT DOCUMENTS 5,485,177 A * 1/1996 Shannon ............... G06F 3/0412
345/182
7,279,730 B2 * 10/2007 Pak ........................ G02F 1/1362
257/290

(Continued)

FOREIGN PATENT DOCUMENTS

CN 103176676 A 6/2013
CN 203133800 U 8/2013

(Continued)

OTHER PUBLICATIONS

The World Intellectual Property Organization (WIPO). International Search Report for PCT/CN2015/089874 dated Dec. 17, 2015 pp. 1-5.

(Continued)

*Primary Examiner* — Christopher E Leiby
(74) *Attorney, Agent, or Firm* — Anova Law Group, PLLC

(57) ABSTRACT

The present disclosure provides a photosensitive array substrate, an optical touch screen including the photosensitive array substrate, and a display device including the optical touch screen. The photosensitive array substrate includes a plurality of gate lines for providing a gate line scanning signal, a plurality of common electrodes, a plurality of touch sensing read lines, and a plurality of photosensitive sensing units coupled to the gate lines, the common electrodes, and the touch sensing read lines for providing corresponding touch sensing control signals over the touch sensing read (Continued)

lines based on an intensity of external light shined on the photosensitive sensing units and controlled by the gate line scanning signal.

17 Claims, 5 Drawing Sheets

(56) References Cited

U.S. PATENT DOCUMENTS

| | | | |
|---|---|---|---|
| 8,587,511 B2* | 11/2013 | Park | G02F 1/135 345/104 |
| 8,659,576 B2* | 2/2014 | Kang | G02F 1/13338 178/18.09 |
| 9,035,916 B2* | 5/2015 | Lien | G06F 3/0416 345/175 |
| 2003/0179323 A1* | 9/2003 | Abileah | G02F 1/13338 349/24 |
| 2008/0024414 A1* | 1/2008 | Shih | G06F 3/0416 345/92 |
| 2008/0198143 A1* | 8/2008 | Kinoshita | G06F 3/0412 345/175 |
| 2009/0147191 A1* | 6/2009 | Nakajima | G02F 1/13318 349/116 |
| 2009/0185095 A1* | 7/2009 | Kim | G02F 1/134309 349/48 |
| 2011/0169772 A1* | 7/2011 | Liu | G06F 3/0412 345/175 |
| 2012/0050220 A1 | 3/2012 | Liu | |
| 2013/0009930 A1* | 1/2013 | Cho | G09G 3/2003 345/211 |
| 2013/0050148 A1* | 2/2013 | Jeon | G06F 3/0386 345/175 |
| 2013/0063400 A1* | 3/2013 | Ahn | H01L 27/14609 345/175 |
| 2014/0184570 A1* | 7/2014 | Ahn | G06F 3/0416 345/175 |
| 2015/0029157 A1 | 1/2015 | Wang | |
| 2015/0029421 A1 | 1/2015 | Gu et al. | |
| 2015/0242040 A1 | 8/2015 | Gu et al. | |
| 2015/0301686 A1 | 10/2015 | Nie et al. | |
| 2015/0339985 A1* | 11/2015 | Hong | G09G 3/3655 345/87 |
| 2016/0018918 A1 | 1/2016 | Chen | |
| 2016/0202806 A1 | 7/2016 | Liu | |
| 2017/0102812 A1 | 4/2017 | Gu | |

FOREIGN PATENT DOCUMENTS

| | | |
|---|---|---|
| CN | 103294283 A | 9/2013 |
| CN | 103353813 A | 10/2013 |
| CN | 103412676 | 11/2013 |
| CN | 103680385 A | 3/2014 |
| CN | 103699264 | 4/2014 |
| CN | 104679355 A | 6/2015 |

OTHER PUBLICATIONS

The State Intellectual Property Office of the People's Republic of China (SIPO). Office Action 1 for 201510121838.0 dated Mar. 24, 2017 pp. 1-14.

* cited by examiner

PHOTOSENSITIVE ARRAY SUBSTRATE, METHOD FOR DRIVING THE SAME, OPTICAL TOUCH SCREEN AND DISPLAY DEVICE

CROSS-REFERENCES TO RELATED APPLICATIONS

This application is a national phase entry under 35 U.S.C. § 371 of International Application No. PCT/CN2015/089874, filed on Sep. 17, 2015, which claims priority to Chinese patent application No. CN201510121838.0, filed on Mar. 19, 2015. The above enumerated patent applications are incorporated by reference herein in their entirety.

FIELD OF THE DISCLOSURE

The present disclosure generally relates to the field of display technologies and, more particularly, relates to a photosensitive array substrate and driving method thereof, an optical touch screen including the photosensitive array substrate and a display device including the optical touch screen.

BACKGROUND

With the development of touch screen technology, touch control technology advances rapidly. Touch control technology is widely used to make touch control display panels by numerous companies. Based on the touch control operation principles, touch screens are divided into different categories: resistive touch screens, capacitive touch screens, infrared touch screens, surface acoustic wave (SAW) touch screens, electromagnetic touch screens, acoustic pulse recognition (APR) touch screens, frustrated total internal reflection (FTIR) touch screens, and etc. Based on the formation structures, touch screens are divided into the following categories: out-cell touch screens (double layers), on-cover touch screens (single layer), on-cell touch screens, and in-cell touch screens.

Meanwhile, the touch screen technology advancement and market demands drive the market trend of having thinner touch display modules. The touch sensing structures are moving away from out-cell touch sensing and towards embedded or integrated touch sensing, which can reduce the thickness of the touch screens as well as substantially reduce the cost of touch screens. Currently, integrated touch screens are divided into three categories: resistive touch screens, capacitive touch screens, and optical touch screens. The resistive touch screens belong to low-end touch sensing technology and may have a short product lifespan. The capacitive touch screens are suitable mainly for small to medium size applications. The optical touch screens may have less limitation on size and may have a prolong product lifespan. Thus, the optical touch control technology may become the mainstream touch sensing technology for the next generation touch screens.

BRIEF SUMMARY OF THE DISCLOSURE

Directed to at least alleviate one or more problems set forth above and other problems in the art, the present disclosure provides a photosensitive array substrate, an optical touch screen and a display device thereof.

One aspect of the present disclosure provides a photosensitive array substrate. The photosensitive array substrate includes a plurality of gate lines for providing a gate line scanning signal, a plurality of common electrodes, a plurality of touch sensing read lines, and a plurality of photosensitive sensing units coupled to the gate lines, the common electrodes, and the touch sensing read lines for providing corresponding touch sensing control signals over the touch sensing read lines based on an intensity of external light shined on the photosensitive sensing units and controlled by the gate line scanning signal.

Optionally, the photosensitive array substrate also includes at least one touch control position detection module for detecting a touch position and a touch mode based on the touch sensing control signals from the touch sensing read lines.

Optionally, the photosensitive array substrate also includes a plurality of data lines for providing data signals to be displayed; and a plurality of display units for displaying the data signals, wherein each photosensitive sensing unit is configured to correspond to at least one display unit.

Optionally, the photosensitive array substrate also includes a signal amplification module coupled between the touch control position detection module and one of the touch sensing read lines for amplifying the touch sensing control signals from the touch sensing read lines to the touch control position detection module.

Optionally, an input terminal of the signal amplification module is connected to one of the touch sensing read lines; and an output terminal of the signal amplification module is connected to the touch control position detection module.

Optionally, the touch control position detection module is configured to determine the touch position and touch mode based on the amplified touch sensing control signals.

Optionally, the gate lines comprises a first gate line and a second gate line, and each optical touch sensing unit comprises a first control terminal connected to the first gate line; a second control terminal connected to the second gate line, wherein the first gate line and the second gate line are two adjacent gate lines; an input terminal connected to one of the common electrodes; and an output terminal connected to one of the touch sensing read lines.

Optionally, the photosensitive sensing unit includes a light sensing module and a control module coupled to the light sensing module, wherein: the light sensing module is configured, in a time-multiplexed manner, to transfer a signal of the common electrode to an input terminal of the control module and to generate an electrical signal from the signal of the common electrode based on a sensed intensity of the external light, and the control module is configured to transfer the electrical signal outputted by the light sensing module to a touch sensing read line.

Optionally, the gate lines comprises a first gate line and a second gate line; a control terminal of the light sensing module is connected to the first gate line; an input terminal of the light sensing module is connected to the common electrode; an output terminal of the light sensing module is connected to the input terminal of the control module; a control terminal of the control module is connected to the second gate line, wherein the first gate line and the second gate line are two adjacent gate lines; and an output terminal of the control module is connected to a touch sensing read line.

Optionally, the light sensing module includes a first switch transistor; a gate electrode of the first switch transistor is connected to the first gate line; a source electrode of the first switch transistor is connected to the common electrode; and a drain electrode of the first switch transistor is connected to the input terminal of the control module.

Optionally, the first switch transistor is made of amorphous silicon; and the first switch transistor has a leakage current proportional to the sensed intensity of the external light shined on an active layer of the first switch transistor.

Optionally, the control module includes a second switch transistor; a gate electrode of the second switch transistor is connected to the second gate line; a source electrode of the second switch transistor is connected to the output terminal of the light sensing module; and a drain electrode of the second switch transistor is connected to the touch sensing read line.

Optionally, each photosensitive sensing unit is configured to: generate a touch sensing control signal with a first level when the photosensitive sensing unit is exposed to the external light brighter than ambient light; generate a touch sensing control signal with a second level when the photosensitive sensing unit is exposed to the ambient light; and generate a touch sensing control signal with a third level when the photosensitive sensing unit is not exposed to the external light or the ambient light.

Optionally, the second level of the touch sensing control signal corresponds to a baseline value; a first preconfigured value is configured greater than the baseline value; and a third preconfigured value is configured smaller than the baseline value.

Optionally, a finger touch mode and a finger touch position are determined when the third level of the touch sensing control signal is greater than the first preconfigured value; and a light pointer touch mode and a light pointer touch position are determined when the first level of the touch sensing control signal is smaller than the third preconfigured value.

Another aspect of the present disclosure provides an optical touch screen. The optical touch screen includes the disclosed photosensitive array substrate.

Optionally, the optical touch screen further includes a color filter substrate. The color filter substrate is configured with a black matrix. The black matrix has openings for exposing regions of active layer of the first switch transistors of the light sensing module.

Another aspect of the present disclosure provides a display device. The display device includes the disclosed optical touch screen.

Another aspect of the present disclosure provides a method for driving a photosensitive array substrate containing a plurality of gate lines, a plurality of common electrodes, a plurality of touch sensing read lines, and a plurality of photosensitive sensing units coupled to the gate lines, the common electrodes, and the touch sensing read lines. The method comprises generating touch sensing control signals over the touch sensing read lines, controlled by a gate line scanning signal provided by the gate lines, based on an intensity of external light shined on the photosensitive sensing units.

Optionally, one of the photosensitive sensing units includes a light sensing module and a control module coupled to the light sensing module.

Optionally, the method also includes providing a reset phase, wherein the gate line scanning signal is selectively applied to the gate lines, and the light sensing module transfers a signal of one of the common electrodes to an input terminal of the control module; providing a hold phase, wherein the light sensing module generates an electrical signal from the signal of one of the common electrodes based on a sensed intensity of the external light shined on the photosensitive sensing units; and providing a readout phase, wherein the control module transfers the electrical signal outputted by the light sensing module to one of the touch sensing read lines as a corresponding touch sensing control signal.

Optionally, the gate lines comprises a first gate line and a second gate line; in the reset phase, the gate line scanning signal is applied to the first gate line; the hold phase includes a time period after the gate line scanning signal is applied to the first gate line and before the gate line scanning signal is applied to the second gate line; and in the readout phase, the gate line scanning signal is applied to the second gate line.

Optionally, the method also includes amplifying the touch sensing control signal from the touch sensing read line using a signal amplification module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 6:
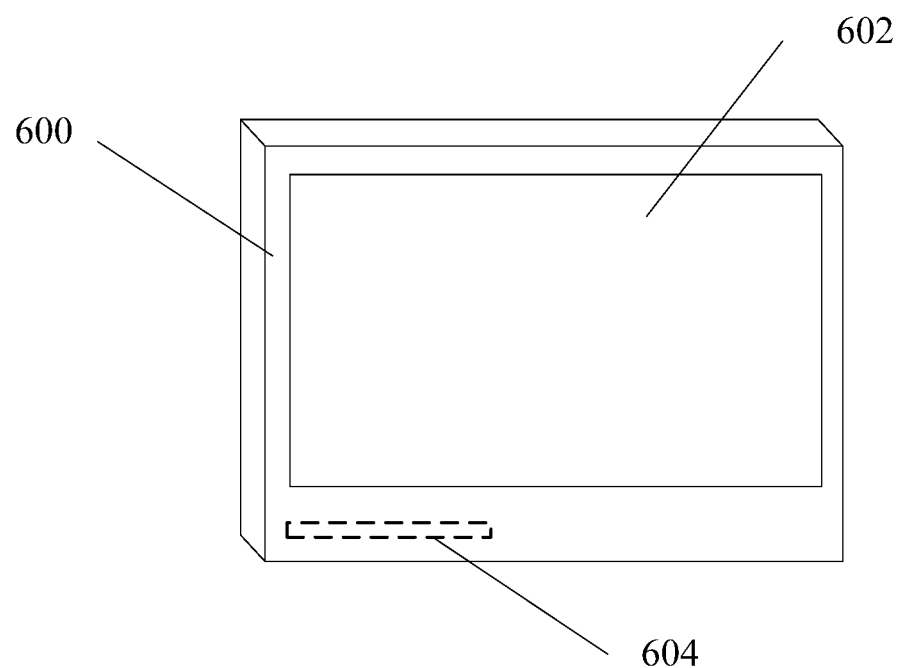
FIG. 6 illustrates an exemplary display device incorporating certain embodiments of the present disclosure.

FIG. 6 illustrates an exemplary display device 600 incorporating certain embodiments of the present disclosure. As shown in FIG. 6, the display device 600 includes a touch screen 602 and a control module 604. The touch screen 602 may be an optical touch screen. The control module 604 may include one or more processors, driving circuitry, memory, and peripherals, etc. Other components may also be included.

Figure 1:
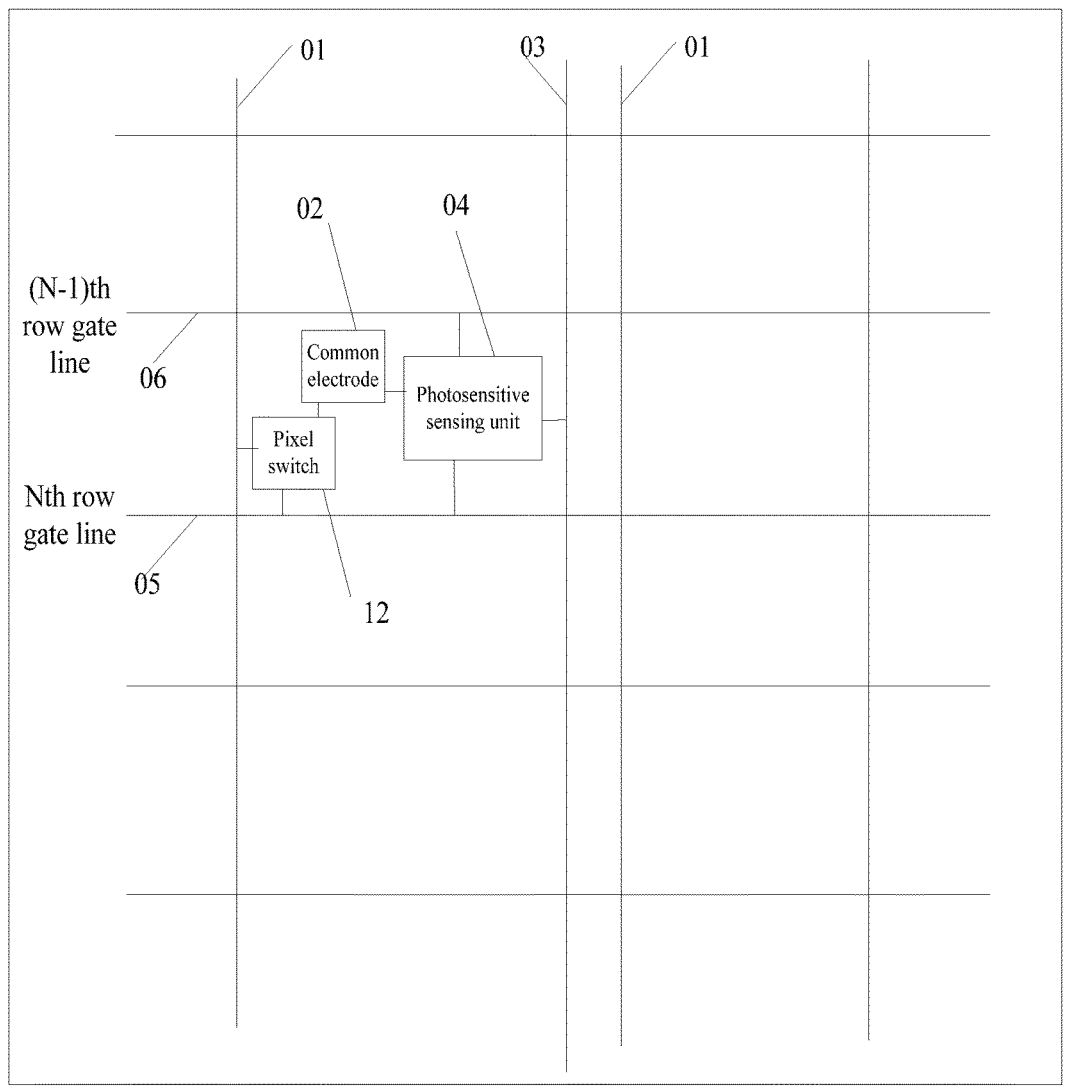
FIGS. 1-3 illustrate schematic views of an exemplary photosensitive array substrate structure according to various disclosed embodiments.

FIG. 1 illustrates an exemplary photosensitive array substrate according to disclosed embodiments. As shown in FIG. 1, the photosensitive array substrate may include a plurality of gate lines, a plurality of data lines 01 and a plurality of common electrodes 02. The photosensitive array substrate may also include a plurality of touch sensing read lines 03 and a plurality of photosensitive sensing units 04.

A plurality of display units (not labeled) may also be arranged on the photosensitive array substrate. Each display unit may be referred as a pixel or sub-pixel and may be controlled by a pixel switch 12, such as a thin film transistor (TFT). The display units or pixels may be arranged in an array along the gate lines, and the pixel switch may connect the display unit to a corresponding data line and gate line, such that the data on the data line can be displayed during a display phase of the photosensitive array substrate.

The plurality of photosensitive sensing units 04 may be arranged similar to the arrangement of the display units, e.g., along the gate lines. In certain embodiments, a photosensitive sensing unit 04 may be corresponding to a display unit, and the photosensitive sensing unit 04 may be integrated into the display unit. For example, the photosensitive sensing unit 04 may share the common electrode with the display unit. In certain other embodiments, a photosensitive sensing unit 04 may be corresponding to multiple display units, and not every display unit is structured to include the photosensitive sensing unit 04. The plurality of photosensitive sensing units 04 may be used for touch control on the photosensitive array substrate during a touch phase of the photosensitive array substrate.

Within a photosensitive sensing unit 04, a first control terminal is connected to a first gate line 05, a second control terminal is connected to a second gate line 06, an input terminal is connected to the common electrode 02, and an output terminal is connected to the touch sensing read line 03.

The photosensitive sensing unit 04 is configured to, within the time period after a gate line scanning signal is applied to the first gate line 05 and before the gate line scanning signal is applied to the second gate line 06, generate an electrical signal from the signal of the common electrode 02 based on the sensed intensity of external light. When the gate scanning signal is applied to the second gate line 06, the electrical signal generated from the signal of the common electrode 02 based on the sensed intensity of the external light is outputted through the touch sensing read line 03. The electrical signal is also known as a touch sensing control signal.

Thus, according to the present disclosure, the photosensitive array substrate includes a plurality of photosensitive sensing units 04. The photosensitive sensing unit 04 generates a touch sensing control signal corresponding to the light intensity of the external light, and outputs the touch sensing control signal through the touch sensing read line 03. The touch sensing control signal can then be used to determine the touch position on the photosensitive array substrate. Thus, the photosensitive sensing can be achieved on the photosensitive array substrate.

Specifically, the photosensitive sensing unit 04 may be disposed between two adjacent gate lines on the photosensitive array substrate. As shown in FIG. 1, the photosensitive sensing unit 04 is disposed between two adjacent gate lines, i.e., the first gate line 05 (the $N_{th}$ row gate line) and the second gate line 06 (the $N-1_{th}$ row gate line) are two adjacent gate lines. The photosensitive sensing unit 04 may also be disposed between two gate lines on the photosensitive array substrate that are not adjacent to each other.

In the photosensitive sensing unit 04, the first control terminal is connected to the $N_{th}$ row gate line, and the second control terminal is connected to the $N-1_{th}$ row gate line. Under the control of the $N_{th}$ row gate line and the $N-1_{th}$ row gate line, the photosensitive sensing unit 04 operates in a time phased manner. Within the time period after the gate line scanning signal is applied to the $N_{th}$ row gate line and before the gate line signal is applied to the $N-1_{th}$ row gate line, the electrical signal is generated from the signal of the common electrode 02 based on the sensed intensity of the external light. When the gate line signal is applied to the $N-1_{th}$ row gate line, the electrical signal generated from the signal of the common electrode 02 based on the sensed intensity of the external light is outputted through the touch sensing read line 03. The gate line row number together with the touch sensing read line column number may provide the coordinate of the touch position. Thus, the photosensitive sensing function of the photosensitive array substrate is achieved.

The photosensitive sensing unit 04 may be configured in every pixel cell between two adjacent gate lines or in the area defined by a plurality of pixel cells between two non-adjacent gate lines. The resolution of the touch sensing is determined by the density of the photosensitive sensing units 04, configured on the photosensitive array substrate.

Figure 2:
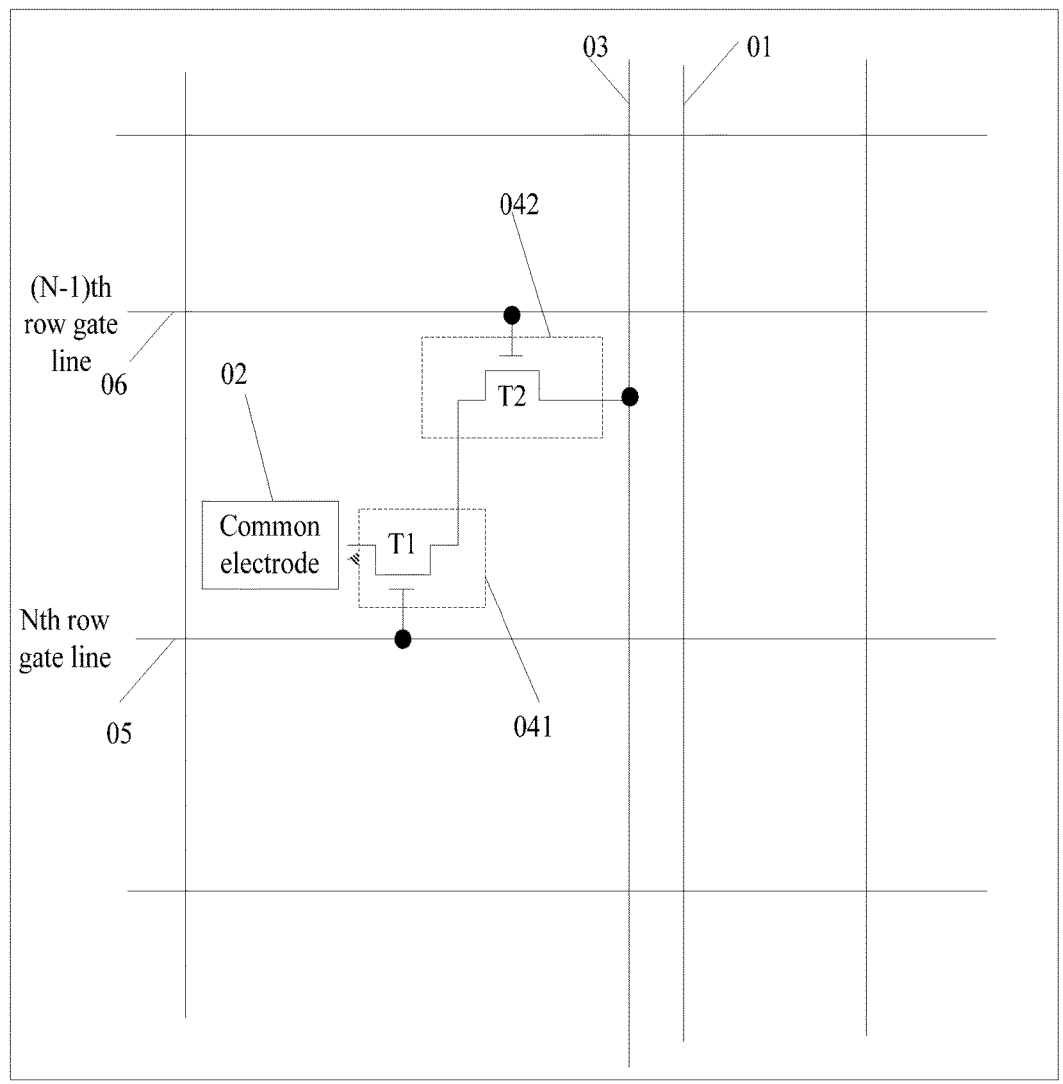

As shown in FIG. 2, more specifically, to achieve the function of outputting the touch sensing control signal, the photosensitive sensing unit 04 includes a light sensing module 041 and a control module 042. For the purposes of simplicity, the display unit/pixel switch 12 is no longer shown in FIG. 2 or other detailed figures.

Within the light sensing module 041, a control terminal is connected to the first gate line 05, an input terminal is connected to the common electrode 02, and an output terminal is connected to the input terminal of the control module 042. When the gate line scanning signal is applied to the first gate line 05, the signal of the common electrode 02 is transferred to the input of the control module 042. Within the time period after the gate line scanning signal is applied to the first gate line 05 and before the gate line scanning signal is applied to the second gate line 06, the electrical signal is generated from the signal of the common electrode 02 based on the sensed intensity of the external light.

Within the control module 042, a control terminal is connected to the second gate line 06 and an output terminal is connected to the touch sensing read line 03. When the gate line scanning signal is applied to the second gate line 06, the electrical signal outputted by the light sensing module 041 is transferred to the light sensing read line 03.

Specifically, the photosensitive sensing unit 04 also includes the light sensing module 041 and the control module 042 coupled to the light sensing module 041. The light sensing module 041 generates the electrical signal from the signal of the common electrode 02 based on the sensed intensity of the external light and outputs the generated electrical signal to the input terminal of the control module 042 as the touch sensing control signal. The control module 042 transfers the touch sensing control signal generated by the light sensing module 041 to the touch sensing read line 03 to achieve the touch sensing control function by the photosensitive array substrate.

The light sensing module 041 may be a photosensitive thin film transistor. Optionally, the light sensing module 041 may be a photosensitive thin film transistor coupled with a capacitor, or the light sensing module 041 may be a photosensitive switch.

In one embodiment, as shown in FIG. 2, in order to generate the electrical signal from the signal of the common electrode 02 based on the sensed intensity of the external light, the light sensing module 041 includes a first switch transistor T1. Within the first switch transistor T1, a gate electrode is connected to the first gate line 05, a source electrode is connected to the common electrode 02 and a drain electrode is connected to the input terminal of the control module 042.

Specifically, the type of the first switch transistors T1 may be the same as the type of switch transistors in a typical pixel cell on the array substrate. For example, the first switch transistors T1 may be either N type transistors or P type transistors, other types of transistors may also be used.

When the gate line scanning signal is applied to the first gate line 05, the first switch transistor T1 is in a conducting state. The conducted first switch transistor T1 connects the common electrode 02 to the input terminal of the control module 042 and transfers the signal of the common electrode 02 to the input terminal of the control module 042. In the meantime, the first switch transistor T1 generates the electrical signal from the signal of the common electrode 02 based on the sensed intensity of the external light, which is also known as the touch sensing control signal. As such, the signal at the input terminal of the control module 042 is the touch sensing control signal generated by the first switch transistor T1 based on the sensed intensity of the external light.

In one embodiment, an opposite substrate may be configured facing toward the photosensitive array substrate. The opposite substrate may be configured with a black matrix having openings corresponding to the regions of active layer of the first switch transistors T1. In one embodiment, the opposite substrate may be a color filter substrate. The photosensitive array substrate coupled with the opposite substrate may form an optical touch screen.

Further, because the first switch transistor T1 generates the electrical signal, i.e., the touch sensing control signal, from the signal of the common electrode 02 based on the sensed intensity of the external light, the active layer of the first switch transistor T1 is made of a photosensitive material, which is sensitive to the external light. Also, the active layer of the first switch transistor T1 cannot be blocked by the black matrix. Thus, the regions on the black matrix corresponding to the active layers of the first switch transistors T1 are configured with openings to prevent the photo sensing function of the first switch transistors T1 from being blocked by the black matrix.

The active layers of the first switch transistors T1 may be made of photosensitive material, for example amorphous silicon. The amorphous silicon is sensitive to light and has desired photosensitivity. In one embodiment, the conventional amorphous silicon process may be configured to fabricate the photosensitive array substrate, without the need to introduce additional fabrication processes.

As shown in FIG. 2, in order to output the light sensing touch control signal to the touch sensing read line 03, the control module 042 includes a second switch transistor T2. Within the second switch transistor T2, a gate electrode is connected to the second gate line 06, a source electrode is connected to the output terminal of the light sensing module 041, and a drain electrode is connected to the touch sensing read line 03.

Specifically, the type of the second switch transistors T2 may be the same as the type of switch transistors in a typical pixel cell on the array substrate. The second switch transistors T2 may be N type transistors or P type transistors. Other types of transistors may also be used.

Further, although the control module 042 as illustrated includes a thin film transistor controlled by a gate line, different control structures may be used. For example, the control module 042 may be controlled by a control signal line, separate and/or independent of the gate line. That is, instead of sharing the gate lines for controlling both the pixels and the photosensitive sensing units, the photosensitive sensing units may be controlled by a different group of control lines.

When the gate line scanning signal is applied to the second gate line 06, the second switch transistor T2 is in a conducting state. The conducted second switch transistor T2 connects the output terminal of the light sensing module 041 to the touch sensing read line 03 and transfers the touch sensing control signal generated by the light sensing module 041 to the touch sensing read line 03 to achieve outputting the touch sensing control signal.

Figure 3:
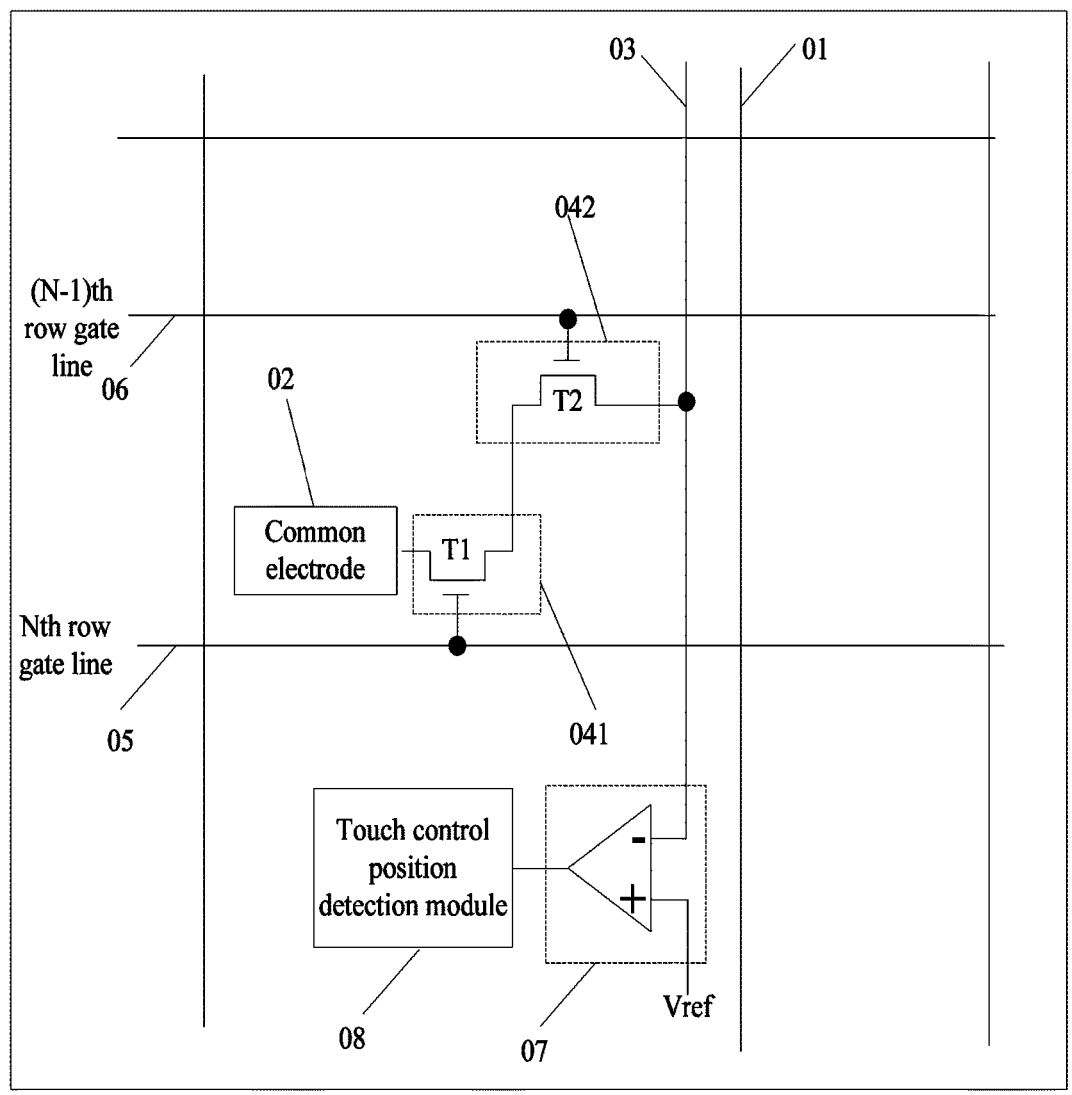

Further, as shown in FIG. 3, the photosensitive array substrate also includes a signal amplification module 07 and a touch control position detection module 08.

Within the signal amplification module 07, an input terminal is connected to the touch sensing read line 03 and an output terminal is connected to the touch control position detection module 08. The signal amplification module 07 is configured to amplify the electrical signal from the touch sensing read line 03 to output to the touch control position detection module 08. The signal amplification module 07 may collect and amplify the signal to be amplified through resistors connected in parallel or through capacitors connected in parallel.

The touch control position detection module 08 is configured to determine the touch position on the photosensitive array substrate according to the amplified electrical signal from the signal amplification module 07. Alternatively, the touch control position module 08 may transfer the amplified touch sensing control signals to a touch IC and let the touch IC determine the touch position on the photosensitive array substrate. Or the amplified touch sensing control signals is directly outputted to the touch IC for realizing the touch control position detection module 08.

Specifically, in one embodiment, the optical touch sensing unit 04 generates the touch sensing control signal based the sensed intensity of the external light to output to the touch sensing read line 03. For accurate recognition, the touch sensing control signal from the touch sensing read line 03 is amplified by the signal amplification module 07. Generally, the signal amplification module 07 uses the amplifier as shown in FIG. 3, and the amplified touch sensing control signal is transferred to the touch control position detection module 08. The touch control position detection module 08 determines the touch position on the photosensitive array substrate based on the amplified light sensing touch control signal.

When the photosensitive sensing unit 04 outputs the electrical signal to the touch sensing read line 03, the electrical signal level increases in the following order: generated by the photosensitive sensing unit 04 exposed to the external light brighter than the ambient light, generated by the photosensitive sensing unit 04 exposed to the ambient light, and generated by the photosensitive sensing unit 04 not exposed to the external light or exposed to the external light substantially darker than the ambient light.

Figure 4:
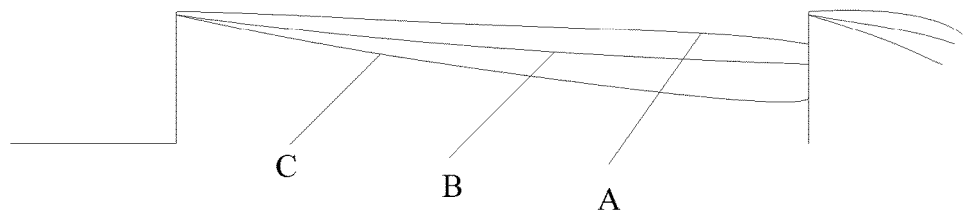
FIG. 4 illustrates various optical touch control signals generated by an exemplary photosensitive sensing unit corresponding to different external light conditions according to various disclosed embodiments.

Specifically, as shown in FIG. 4, when the photosensitive array substrate is exposed to the ambient light, the light sensing module 041 of the photosensitive array substrate generates a touch sensing control signal B based on the sensed intensity of the ambient light. When the photosensitive array substrate is exposed to the external light brighter than the ambient light, the light sensing module 041 of the photosensitive array substrate generates a touch sensing control signal C with smaller amplitude than the touch sensing control signal B corresponding to the sensed intensity of the ambient light. When the photosensitive array substrate is not exposed to the external light or is exposed to the external light substantially darker than the ambient light, the light sensing module 041 of the photosensitive array substrate generates a touch sensing control signal A with greater amplitude than the touch sensing control signal B corresponding to the sensed intensity of the ambient light.

The photosensitive array substrate generates touch sensing control signals of various levels based on the sensed intensity of the external light. Thus, the touch control position detection module 08 is able to determine the touch position and touch mode based on the various levels of the touch sensing control signals.

In one embodiment, the touch control position detection module 08 uses the following method to determine the touch position and touch mode on the photosensitive array substrate. When the level of the received touch sensing control signal is greater than a first preconfigured value, the touch control position detection module 08 determines a finger or a pointer touch position on the photosensitive array substrate. When the level of the received touch sensing control signal is smaller than a second preconfigured value, the touch control position detection module 08 is configured to determine a light pointer or light stylus touch position on the photosensitive array substrate. The first preconfigured value is greater than a baseline value. The second preconfigured value is smaller than the baseline value. The baseline value is the level of the electrical signal outputted by the photosensitive sensing unit 04 and amplified by the signal amplification module 07 when the photosensitive sensing unit 04 is exposed to the ambient light. The baseline value may be preconfigured or may be calibrated periodically based on the ambient light of the photosensitive array substrate.

Specifically, when the photosensitive array substrate is exposed to the ambient light, the photosensitive sensing unit 04 outputs the touch sensing control signal. The touch sensing control signal is then amplified by the signal amplification module 07. The level of the amplified signal may be the baseline value. The baseline value is used as the reference to configure the first preconfigured value and the second preconfigured value. A finger touch operation is equivalent to no light or substantially darker light sensed by the photosensitive array substrate. A pointer touch operation is equivalent to a bright light sensed by the photosensitive array substrate. The two touch control operations generate different levels of the touch sensing control signals, respectively, such that the touch control position detection module 08 can determine the touch mode on the photosensitive array substrate based on various levels of the touch sensing control signals, i.e., a finger touch or a pointer or light stylus touch or a light pointer.

In addition, the touch control position detection module 08 or an IC can determine the touch position, i.e., the X-coordinate and the Y-coordinate of the touch position, based on the gate lines and the touch sensing read lines. For example, the horizontal coordinate (X-coordinate) of the touch position can be determined based on the position of the first gate line 05 corresponding to the touch sensing control signal received, and the vertical coordinate (Y-coordinate) of the touch position can be determined based on the position of the touch sensing read line 03 with the touch sensing control signal.

According to the present disclosure, the switch transistors may be thin film transistors (TFT) or metal oxide semiconductor field effect transistors (MOSFET), or other types of transistors. The source electrode and the drain electrode of the transistors may be interchangeable. The thin film transistors are used as examples for illustrations.

Figure 5:
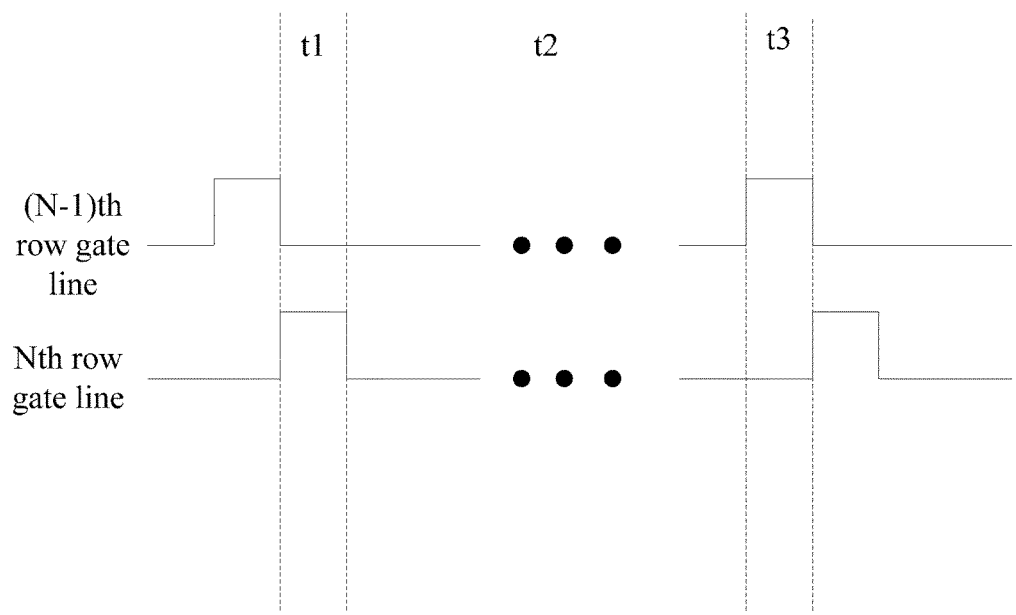
FIG. 5 illustrates the photosensitive sensing operation phases by an exemplary photosensitive array substrate according to various disclosed embodiments.

The detailed operation of the optical touch screen may be illustrated using the photosensitive array substrate structure as shown in FIG. 3. As shown in FIG. 3, the transistors of the optical touch screen are N type transistors and the corresponding gate line scanning signal is a high level signal. Specifically, three time periods or phases t1-t3 as shown in FIG. 5 are described herein. In the following description, '1' indicates a high level signal and '0' indicates a low level signal.

In the t1 phase, the gate line scanning signal is applied to the $N_{th}$ row gate line. The first switch transistor T1 transitions into the conducting state and connects the common electrode 02 to the source electrode of the second switch transistor T2. Thus, the signal of the common electrode 02 is transferred to the source electrode of the second switch transistor T2. This phase is called the reset phase.

In the t2 phase, no gate line scanning signal is applied to either the $N_{th}$ row gate line or the $N-1_{th}$ row gate line. Both the first switch transistor T1 and the second switch transistor T2 are in the cutoff state. The first switch transistor T1 generates the electrical signal from the signal of the common electrode 02 based on the sensed intensity of the external light, i.e., the touch sensing control signal based on the sensed intensity of the external light. This phase is called the hold phase or the touch sensing control signal generating phase. In certain embodiments, data from the data lines 01 may be displayed by the display units or pixels by controlling the pixel switch.

In the t3 phase, the gate line scanning signal is only applied to the $N-1_{th}$ gate line. The second switch transistor T2 transitions into the conducting state, connects the source electrode of the second switch transistor T2 to the touch sensing read line 03, and outputs the touch sensing control signal generated based on the sensed intensity of the external light to the touch sensing read line 03. This phase is called the readout phase.

Subsequently, the touch sensing control signal is outputted to the signal amplification module 07 through the touch sensing read line 03. The touch sensing control signal is amplified by the signal amplification module 07 and is outputted to the touch control position detection module 08. The touch control position detection module 08 determines the touch position and touch mode on the photosensitive array substrate. Thus, the photosensitive touch control on the photosensitive array substrate is achieved.

Thus, during these phases of touch-sensing operation, with respect to the photosensitive sensing unit including the light sensing module (e.g., first switch transistor T1) and a control module (e.g., second switch transistor T2), the light sensing module is configured, in a time-multiplexed manner, to transfer a signal of the common electrode to an input terminal of the control module and to generate an electrical signal from the signal of the common electrode based on a sensed intensity of the external light; while the control module is configured to transfer the electrical signal outputted by the light sensing module to a touch sensing read line.

Accordingly, as previously described, the present disclosure also provides a method for driving the disclosed photosensitive array substrate. For example, according to the driving method, touch sensing control signals are generate over the touch sensing read lines, controlled by a gate line scanning signal provided by the gate lines, based on an intensity of external light shined on the photosensitive sensing units, each of the photosensitive sensing units includes a light sensing module and a control module coupled to the light sensing module.

Further, a reset phase is provided, during which the gate line scanning signal is selectively applied to the gate lines, and the light sensing module transfers a signal of one of the common electrodes to an input terminal of the control module. Further, a hold phase is provided, during which the light sensing module generates an electrical signal from the signal of one of the common electrodes based on a sensed intensity of the external light shined on the photosensitive sensing units. Further, a readout phase is provided, during which the control module transfers the electrical signal outputted by the light sensing module to one of the touch sensing read lines as a corresponding touch sensing control signal.

The gate lines may include a first gate line and a second gate line. In the reset phase, the gate line scanning signal is applied to the first gate line. The hold phase includes a time period after the gate line scanning signal is applied to the first gate line and before the gate line scanning signal is applied to the second gate line and, in the readout phase, the gate line scanning signal is applied to the second gate line. Further, the touch sensing control signal from the touch sensing read line may be amplified using a signal amplification module.

Accordingly, as previously described, the present disclosure also provides a display device, including the disclosed optical touch screen. The display device may be a smart phone, a tablet computer, a television, a digital signage, a laptop computer, a digital picture frame, a navigation device, and other products and components having display function. Because such display device and the optical touch screen share the same operation principle, the display device may be implemented based on the exemplary embodiments of the optical touch screen.

Thus, the present disclosure provides a photosensitive array substrate, an optical touch screen and a display device thereof. The optical touch screen includes the photosensitive array substrate configured with the gate lines, the data lines, and the common electrodes. The optical touch screen also includes the touch sensing read lines extended in the same direction as the data lines, and the optical touch sensing units. Within the photosensitive sensing unit, the first control terminal is connected to the first gate line, the second control terminal is connected to the second gate line, the input terminal is connected to the common electrode, and the output terminal is connected to the touch sensing read line.

Within the time period after the gate line scanning signal is applied to the first gate line and before the gate line scanning signal is applied to the second gate line, the photosensitive sensing unit is configured to generate the electrical signal from the signal of the common electrode based on the sensed intensity of the external light. When the gate line scanning signal is applied to the second gate line, the electrical signal generated from the signal of the common electrode based on the sensed intensity of the external light is outputted to the touch sensing read line.

Thus, through the photosensitive sensing unit configured in the optical touch screen, the optical touch screen generates the touch sensing control signal based on the sensed intensity of the external light, outputs the light sensing touch control signal to the touch sensing read line, and determines the touch position and touch mode on the optical touch screen based on the touch sensing control signal. Thus, the optical touch sensing is achieved by the optical touch screen.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A photosensitive array substrate, comprising:
   a plurality of gate lines for providing a gate line scanning signal, the gate lines comprising a first gate line and a second gate line adjacent to each other;
   a plurality of common electrodes for providing a common voltage signal;
   a plurality of touch sensing read lines; and
   a plurality of photosensitive sensing units free of capacitor and coupled to the gate lines, the common electrodes, and the touch sensing read lines, the photosensitive sensing units being configured to generate corresponding touch sensing control signals from the common voltage signal based on an intensity of external light shined on the photosensitive sensing units and to provide the touch sensing control signals over the touch sensing read lines as controlled by the gate line scanning signal,
   wherein:
   at least one of the common electrodes is connected between a corresponding one of the photosensitive sensing units and a corresponding pixel switch;
   the one of the photosensitive sensing units includes a first switch transistor and a second switch transistor;
   a gate electrode of the first switch transistor is connected to the first gate line;
   a source electrode of the first switch transistor is connected to the at least one of the common electrodes;
   a drain electrode of the first switch transistor is connected to a source electrode of the second switch transistor;
   a gate electrode of the second switch transistor is connected to the second gate line; and
   a drain electrode of the second switch transistor is connected to one of the touch sensing read lines.

2. The photosensitive array substrate of claim 1, further comprising:
   at least one touch control position detection module for detecting a touch position and a touch mode based on the touch sensing control signals from the touch sensing read lines.

3. The photosensitive array substrate of claim 2, further including:
   a plurality of data lines for providing data signals to be displayed; and
   a plurality of display units for displaying the data signals, wherein each photosensitive sensing unit is configured to correspond to at least one display unit.

4. The photosensitive array substrate of claim 3, further including:
   a signal amplification module coupled between the touch control position detection module and the one of the touch sensing read lines for amplifying the touch sensing control signals from the one of the touch sensing read lines to the touch control position detection module.

5. The photosensitive array substrate of claim 4, wherein:
   an input terminal of the signal amplification module is connected to the one of the touch sensing read lines; and
   an output terminal of the signal amplification module is connected to the touch control position detection module.

6. The photosensitive array substrate of claim 4, wherein:
   the touch control position detection module is configured to determine the touch position and touch mode based on the amplified touch sensing control signals.

7. The photosensitive array substrate of claim 1, wherein:
the first switch transistor is configured, in a time-multiplexed manner, to transfer the common voltage signal to source electrode of the second switch transistor and to generate an electrical signal from the common voltage signal based on a sensed intensity of the external light, and
the second switch transistor is configured to transfer the electrical signal outputted by the first switch transistor to the one of the touch sensing read lines as a corresponding touch sensing control signal.

8. The photosensitive array substrate of claim 1, wherein:
the first switch transistor is made of amorphous silicon; and
the first switch transistor has a leakage current proportional to the sensed intensity of the external light shined on an active layer of the first switch transistor.

9. The photosensitive array substrate of claim 1, wherein each photosensitive sensing unit is configured to:
generate a touch sensing control signal with a first level when the photosensitive sensing unit is exposed to the external light brighter than ambient light;
generate a touch sensing control signal with a second level when the photosensitive sensing unit is exposed to the ambient light; and
generate a touch sensing control signal with a third level when the photosensitive sensing unit is not exposed to the external light or the ambient light.

10. The photosensitive array substrate of claim 9, wherein:
the second level of the touch sensing control signal corresponds to a baseline value;
a first preconfigured value is configured greater than the baseline value; and
a third preconfigured value is configured smaller than the baseline value.

11. The photosensitive array substrate of claim 10, wherein:
a finger touch mode and a finger touch position are determined when the third level of the touch sensing control signal is greater than the first preconfigured value; and
a light pointer touch mode and a light pointer touch position are determined when the first level of the touch sensing control signal is smaller than the third preconfigured value.

12. A display system, comprising the photosensitive array substrate according to claim 1.

13. The display system of claim 12, further including a color filter substrate, wherein:
the color filter substrate is configured with a black matrix; and
the black matrix has an opening for exposing a region of active layer of the first switch transistor.

14. A method for driving a photosensitive array substrate containing a plurality of gate lines comprising a first gate line and a second gate line adjacent to each other, a plurality of common electrodes, a plurality of touch sensing read lines, and a plurality of photosensitive sensing units free of capacitor and coupled to the gate lines, the common electrodes, and the touch sensing read lines, wherein, the method comprises:
providing a common voltage signal through the common electrodes;
generating, by the photosensitive sensing units, touch sensing control signals from the common voltage signal based on an intensity of external light shined on the photosensitive sensing units; and
providing, by the photosensitive sensing units, the touch sensing control signals over the touch sensing read lines, controlled by a gate line scanning signal provided by the gate lines,
wherein:
at least one of the common electrodes is connected between a corresponding one of the photo sensitive sensing units and a corresponding pixel switch;
the one of the photosensitive sensing units includes a first switch transistor and a second switch transistor;
a gate electrode of the first switch transistor is connected to the first gate line;
a source electrode of the first switch transistor is connected to the at least one of the common electrodes;
a drain electrode of the first switch transistor is connected to a source electrode of the second switch transistor;
a gate electrode of the second switch transistor is connected to the second gate line; and
a drain electrode of the second switch transistor is connected to one of the touch sensing read lines.

15. The method of claim 14, wherein:
in a reset phase, the gate line scanning signal is selectively applied to the gate lines, and the first switch transistor transfers the common voltage signal to a source electrode of the second switch transistor;
in a hold phase, the first switch transistor generates an electrical signal from the common voltage signal based on a sensed intensity of the external light shined on the one of the photosensitive sensing units; and
in a readout phase, the second switch transistor transfers the electrical signal outputted by the first switch transistor to one of the touch sensing read lines as a corresponding touch sensing control signal.

16. The method of claim 15, wherein:
in the reset phase, the gate line scanning signal is applied to the first gate line;
the hold phase includes a time period after the gate line scanning signal is applied to the first gate line and before the gate line scanning signal is applied to the second gate line; and
in the readout phase, the gate line scanning signal is applied to the second gate line.

17. The method of claim 16, further including:
amplifying the touch sensing control signal from the one of the touch sensing read lines using a signal amplification module.

* * * * *